United States Patent
Szor (10) Patent No.: US 7,334,263 B2
(45) Date of Patent: Feb. 19, 2008

(54) DETECTING VIRUSES USING REGISTER STATE

(75) Inventor: Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 765 days.

(21) Appl. No.: 10/818,634

(22) Filed: Apr. 5, 2004

(65) Prior Publication Data

US 2004/0255165 A1    Dec. 16, 2004

Related U.S. Application Data

(63) Continuation-in-part of application No. 10/154,070, filed on May 23, 2002.

(51) Int. Cl.
*H04L 9/00* (2006.01)

(52) U.S. Cl. .............. 726/22; 726/23; 726/24; 726/25; 726/26; 713/165; 713/167; 713/188; 709/1

(58) Field of Classification Search ............ None
See application file for complete search history.

(56) References Cited

U.S. PATENT DOCUMENTS

| | | |
|---|---|---|
| 5,386,523 A | 1/1995 | Crook et al. |
| 5,696,822 A | 12/1997 | Nachenberg |
| 5,712,583 A | 1/1998 | Frankeny |
| 5,796,989 A | 8/1998 | Morley et al. |
| 5,826,013 A | 10/1998 | Nachenberg |
| 5,854,916 A | 12/1998 | Nachenberg |
| 5,881,151 A | 3/1999 | Yamamoto |
| 5,964,889 A | 10/1999 | Nachenberg |
| 5,978,917 A * | 11/1999 | Chi .............. 726/22 |
| 5,999,723 A | 12/1999 | Nachenberg |
| 6,016,542 A | 1/2000 | Gottlieb et al. |

(Continued)

FOREIGN PATENT DOCUMENTS

WO    WO 99/15966    4/1999

OTHER PUBLICATIONS

Sidiroglou, S., et al, 'An Email Worm Vaccine Architecture', 2005, Dept. of Computer Science, Columbia University, entire document, http://www1.cs.columbia.edu/~angelos/Papers/2005/email-worm.pdf.*

(Continued)

*Primary Examiner*—Nasser Moazzami
*Assistant Examiner*—Ronald Baum
(74) *Attorney, Agent, or Firm*—Fenwick & West LLP (57) ABSTRACT

A register signature specifies an initial state of a virtual machine (422) and changes to the initial state made by a block of viral code. A virus detection system (VDS) The VDS (400) selects (810) a file that might contain a computer virus, identifies (812) potential entry points in the file, and identifies (814) possible viral code at or near the entry point. The VDS (400) uses a virtual machine (422) having the initial state specified by the register signature to emulate (820) the possible viral code. While emulating, the VDS (400) builds (822) a register table that tracks the state of the virtual registers (428). Once the VDS (400) reaches an emulation breakpoint, it analyzes the register table in view of the register signature to determine if the new state of the virtual machine is evidence that the emulated instructions are part of a virus.

30 Claims, 9 Drawing Sheets

U.S. PATENT DOCUMENTS

| | | | |
|---|---|---|---|
| 6,021,510 | A | 2/2000 | Nachenberg |
| 6,067,410 | A | 5/2000 | Nachenberg |
| 6,088,803 | A | 7/2000 | Tso et al. |
| 6,094,731 | A | 7/2000 | Waldin et al. |
| 6,311,277 | B1 | 10/2001 | Takaragi et al. |
| 6,347,375 | B1 | 2/2002 | Reinert et al. |
| 6,357,008 | B1 | 3/2002 | Nachenberg |
| 6,564,154 | B1 | 5/2003 | Zimmerman et al. |
| 6,851,057 | B1 | 2/2005 | Nachenberg |
| 6,971,019 | B1 | 11/2005 | Nachenberg |
| 6,981,279 | B1 * | 12/2005 | Arnold et al. ............. 726/22 |
| 7,092,861 | B1 | 8/2006 | Shteyn |
| 7,146,305 | B2 * | 12/2006 | van der Made ............ 703/22 |
| 2006/0100010 | A1 | 5/2006 | Gatto et al. |

OTHER PUBLICATIONS

"Frequently Asked Questions on Virus-L/comp.virus," [online]. Oct. 9, 1995 [retrieved on Nov. 25, 2003]. Retrieved from the Internet: <URL: http://www.claws-and-paws.com/virus/faqs/vlfaq200.shtml>, 53 pages.

LeCharlier et al., "Dynamic Detection and Classification of Computer Viruses Using General Behaviour Patterns," Proceedings of the Fifth International Virus Bulletin Conference, Boston, Mass., Sep. 20-22, 1995, 22 pages.

Leitold et al., "VIRus Searching and KILling Language," Proceedings of the Second International Virus Bulletin Conference, Sep. 1992, 15 pages.

McCanne et al., "The BSD Packet Filter: A new Architecture for User-level Packet Capture," Preprint Dec. 19, 1992, 1993 Winter USENIX conference, San Diego, California, Jan. 25-29, 1993, 11 pages.

Nachenberg, "A New Technique for Detecting Polymorphic Computer Viruses," Thesis, University of Los Angeles, 132 pages, 1995.

Padawer, "Microsoft P-Code Technology," [online]. Apr. 1992 [retrieved on Nov. 13, 2003]. Retrieved from the Internet: <URL: http://msdn.Microsoft.com/archive/en-us/dnarvc/html/msdn__c7pcode2.asp?frame=true.>, 6 pages.

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

PCT International Search Report, International Application No. PCT/US03/16445, Sep. 10, 2003, 4 pages.

PCT International Search Report, International Application No. PCT/US01/08058, Aug. 30, 2002, 4 pages.

Symantec, Understanding Heuristics: Symantec's Bloodhound Technology, 1997, Symantec White Paper Series, vol. XXXIV.

Ször, "Attacks on Win32," Virus Bulletin Conference, Oct. 1998, 84 pages.

Ször, "Memory Scanning Under Windows NT," Virus Bulletin Conference, Sep. 1999, 22 pages.

Szor, "The New 32-bit Medusa," Virus Bulletin, Dec. 2000, ISSN 0956-09979, 4 pages.

Taubes, "An Immune System for Cyberspace," Think Research [online], vol. 34, No. 4, 1996 [retrieved on Dec. 15, 2003]. Retrieved from the Internet: <URL: http://domino.research.ibm.com/comm./wwwr_thinkresearch.nsf/pages/antivirus496.html>, 9 pages.

Trend Micro, Inc., Eliminating Viruses in the Lotus Notes Environment, 1999, Trend Micro Product Paper.

PCT International Search Report, International Application No. PCT/US03/16445, Sep. 10, 2003, 4 pages.

* cited by examiner

| ITERATION | REG 0 | REG 1 | ... | REG N | OPCODE |
|---|---|---|---|---|---|
| 0000 | 0050 | 06FA | | 0000 | 4AFF |
| 0001 | ACFD | 06EF | | 0000 | 8BDS |
| 0002 | 046F | 06EE | | 0000 | 58 |
| 0003 | B406 | 06ED | | 042A | BF0C0000 |
| 0004 | FF23 | 06EC | | 042A | 8B1A |
| 0005 | 74A0 | 06EB | | 042A | 5A |
| 0006 | 0000 | 06EA | | FF84 | 89B4BA181100 |
| 0007 | 04FE | 06DF | | FF84 | B640 |
| 0008 | 1475 | 06DE | | FF84 | 894E04 |

DETECTING VIRUSES USING REGISTER STATE

CROSS-REFERENCE TO RELATED APPLICATION

This application is a continuation-in-part of application Ser. No. 10/154,070, filed May 23, 2002, which is incorporated herein by reference.

BACKGROUND OF THE INVENTION

1. Field of the Invention

This invention pertains in general to detecting computer viruses and in particular to detecting polymorphic computer viruses.

2. Background Art

Modern computer systems are under constant threat of attack from computer viruses and other malicious code. Viruses often spread through the traditional route: a computer user inserts a disk or other medium infected with a virus into a computer system. The virus infects the computer system when data on the disk are accessed.

Viruses also spread through new routes. A greater number of computer systems are connected to the Internet and other communications networks than ever before. These networks allow a networked computer to access a wide range of programs and data, but also provide a multitude of new avenues by which a computer virus can infect the computer. For example, a virus can be downloaded to a computer as an executable program, as an email attachment, as malicious code on a web page, etc. Accordingly, it is common practice to install anti-virus software on computer systems in order to detect the presence of viruses.

Simple computer viruses work by copying exact duplicates of themselves to each executable program file they infect. When an infected program is executed, the simple virus gains control of the computer system and attempts to infect other files. If the virus locates a target executable file for infection, it copies itself byte-for-byte to the target executable file. Because this type of virus replicates an identical copy of itself each time it infects a new file, the anti-virus software can detect the virus quite easily by scanning the file for a specific string of bytes (i.e. a "signature") characteristic of the virus.

The designers of computer viruses are constantly evolving new techniques for eluding the anti-virus software. Encrypted viruses are examples of one such technique. Encrypted viruses include a decryption routine (also known as a "decryption loop") and an encrypted viral body. When a file infected with an encrypted virus executes, the decryption routine gains control of the computer and decrypts the encrypted viral body. The decryption routine then transfers control to the decrypted viral body, which is capable of spreading the virus. The virus spreads by copying the identical decryption routine and the encrypted viral body to the target executable file. Although the viral body is encrypted and thus hidden from view, anti-virus software can detect these viruses by searching for a signature in the unchanging decryption routine.

A polymorphic encrypted virus ("polymorphic virus") includes a decryption routine and an encrypted viral body. The viral body includes a static portion and a machine-code generator often referred to as a "mutation engine." The operation of a polymorphic virus is similar to the operation of an encrypted virus, except that the polymorphic virus generates a new decryption routine each time it infects a file. Many polymorphic viruses use decryption routines that are functionally the same for all infected files, but have different sequences of instructions.

These multifarious mutations allow each decryption routine to have a different signature. Therefore, anti-virus software cannot detect polymorphic viruses by simply searching for a signature from a decryption routine. Instead, the software loads a possibly-infected program into a software-based CPU emulator acting as a simulated virtual computer. The program is allowed to execute freely within this virtual computer. If the program does in fact contain a polymorphic virus, the decryption routine is allowed to decrypt the viral body. The anti-virus software detects the virus by searching through the virtual memory of the virtual computer for a signature from the decrypted viral body.

Virus creators have developed several techniques for attempting to defeat emulator-based virus detection. First, virus creators have produced "metamorphic" viruses that are not necessarily encrypted, but vary the instructions in the viral body with each infection. The varying instructions make it difficult to detect the viruses using signature scanning. Second, virus creators have produced decryption engines that utilize CPU instructions that are not emulated by the emulator, which causes the virus to not decrypt its viral body and signature scanning to fail. Third, virus makers have created entry point obscuring viruses that make it difficult to determine where in a file the viral code is resident, thereby making it difficult to determine what instructions to emulate in order to decrypt the viral body.

Therefore, there is a need in the art for a technique that can reliably detect viruses having non-emulated instructions and/or obscured entry points.

BRIEF SUMMARY OF THE INVENTION

The above need is met by a virus detection system (VDS) (400) that uses register signatures to detect viruses. The VDS (400) in one embodiment includes a data module (410), an engine module (412), an emulating module (412), and a virus database module (430). The operation of the VDS (400) is preferably driven by P-code instructions stored in the data module (410). The engine module (412) includes a P-code interpreter (416) for interpreting the P-code and controlling the VDS (400) in response.

The emulating module (412) is controlled by the engine module (412) and executes computer program instructions in a virtual machine (422) having a virtual processor (424), virtual registers (428), and a virtual memory (426). The virtual machine (422) executes the instructions in isolation from the actual hardware and software on the computer system (200) so that a virus in the virtual machine cannot infect files on the computer system.

The virus database module (430) stores register signatures for detecting evidence of a virus. A register signature describes initial states to be utilized when emulating blocks of instructions that are potentially part of a virus. The register signature also describes changes to the initial states (or the lack thereof) that will occur if the emulated blocks of instructions are part of a virus.

In one embodiment, the P-code instructions in the data module (410) include a file selection module (510) for filtering the files on the computer system (200) to identify potential virus host files. An emulation control module (520) identifies and selects potential virus entry points in the selected file, and identifies possible virus code at or near the entry points. The VDS (400) sets the initial conditions of the virtual machine (422) according to a register signature and emulates the possible virus code until reaching breakpoint conditions. While the emulating module (412) emulates the instructions, a table builder module (522) builds a table (600) tracking the values of virtual registers (428).

Once the emulation reaches a breakpoint or otherwise stops, a virus reporting module (526) analyzes the table (600) to determine whether the resulting state of the virtual registers (428) is consistent with viral code operating on the registers in the initial state. If the resulting state of the registers is consistent with a virus, the VDS (400) responds (828) to the potential virus.

BRIEF DESCRIPTION OF THE DRAWINGS

FIGS. 8A-89B depict flowcharts illustrating the operation of the VDS 400 to detect evidence of a virus according to an embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

In order to accomplish the mischief for which they are designed, computer viruses must gain control of a computer's central processing unit (CPU). Viruses typically gain this control by attaching themselves to an executable file (the "host file") and modifying the executable image of the host file to pass control of the CPU to the viral code. The virus conceals its presence by executing its own instructions and then calling the original instructions in order to pass control back to the host file. As used herein, the term "virus" also includes other forms of malicious code such as "worms" and "Trojan horses" that can infiltrate and infect a computer system.

Viruses use different techniques to infect the host file. For example, a simple virus always inserts the same viral body into the file. An encrypted virus infects a file by inserting an unchanging decryption routine and an encrypted viral body into the host file. A polymorphic encrypted virus (a "polymorphic virus") is similar to an encrypted virus, except that a polymorphic virus generates a new decryption routine each time it infects a file. A metamorphic virus is not necessarily encrypted, but it reorders the instructions in the viral body into a functionally equivalent, but different, virus each time it infects a file. A virus may use a combination of the techniques described above.

A virus typically infects a host file by attaching or altering code at or near an entry point of the file. An "entry point" is any instruction or instructions in the file, a pointer to an instruction or instructions, or other data in the file that a virus can modify to gain control of the computer system at which the file is located. An entry point is typically identified by an offset from some arbitrary point in the file. Certain entry points are located at the beginning of a file or region and, thus, are always invoked when the file or region is executed. For example, an entry point can be the first instruction executed when the host file is executed or a function within the file is called. Other entry points may consist of single instructions deep within the file that can be modified by a virus. For example, the entry point can be a CALL or JMP instruction that is modified to invoke viral code. Once a virus seizes control of the computer system through the entry point, the virus typically infects other files on the system or files on other systems networked with the host system.

Figure 1:
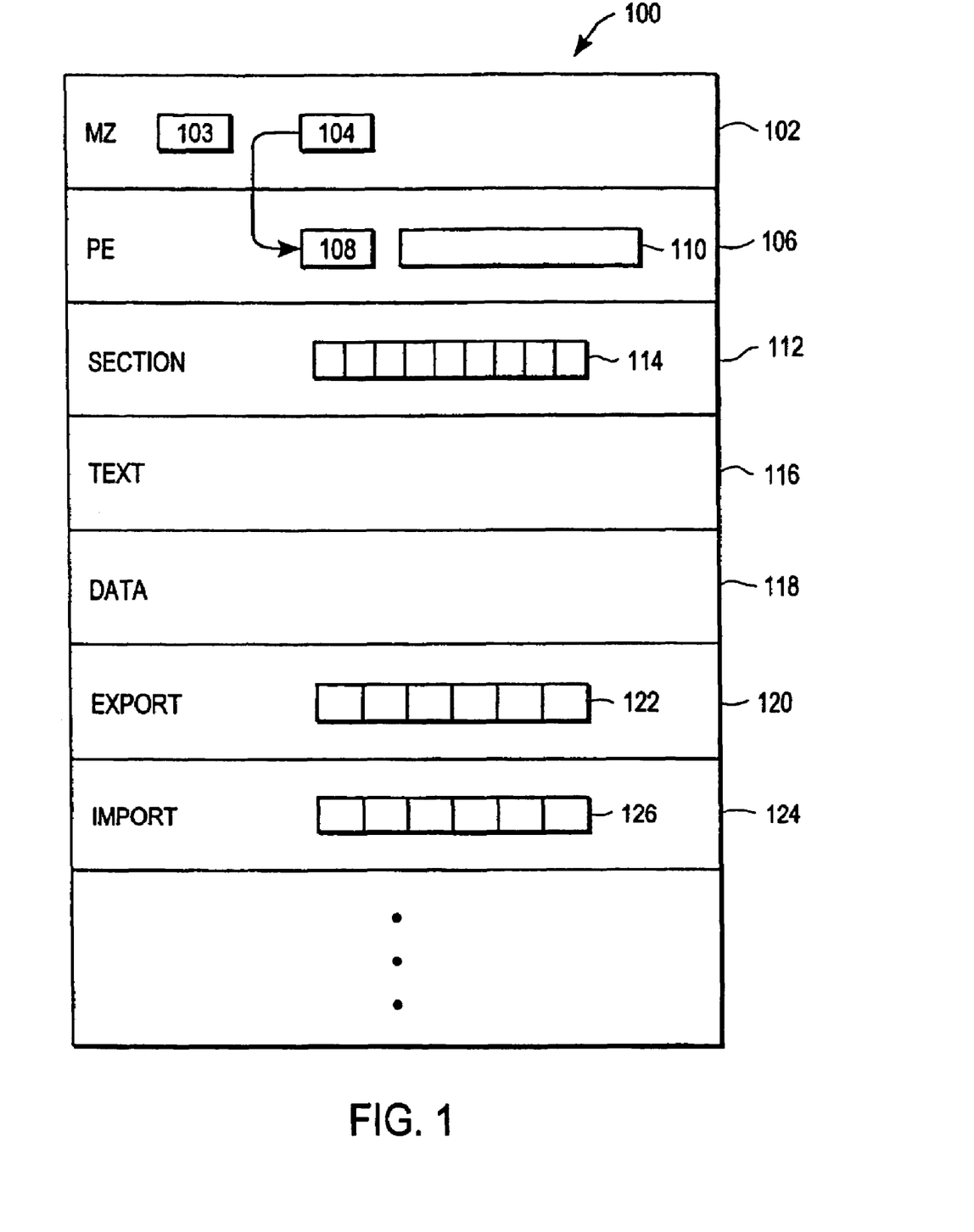
FIG. 1 is a high-level block diagram illustrating a potential virus host file 100 having multiple entry points.

FIG. 1 is a high-level block diagram of a potential virus host file 100 having multiple entry points that can be infected by a virus as described above. In the example illustrated by FIG. 1, the executable file is a Win32 portable executable (PE) file intended for use with a MICROSOFT WINDOWS-based operating system (OS), such as WINDOWS ME, WINDOWS NT, WINDOWS 2000, or WINDOWS XP. Typically, the illustrated file 100 is of the type .EXE, indicating that the file is an executable file, or .DLL, indicating that the file is a dynamic link library (DLL). However, the present invention can be used with any file, and is not limited to only the type of file illustrated in FIG. 1. APPLE MACINTOSH and LINUX files, for example, share many similarities with Win32 files, and the present invention is equally applicable to such files.

The file 100 is divided into sections containing either code or data and aligned along four kilobyte (KB) boundaries. The MS-DOS section 102 contains the MS-DOS header 102 and is marked by the characters "MZ." This section 102 contains a small executable program 103 designed to display an error message if the executable file is run in an unsupported OS (e.g., MS-DOS). This program 103 is an entry point for the file 100. The MS-DOS section 102 also contains a field 104 holding the relative offset to the start 108 of the PE section 106. This field 104 is another entry point for the file 100.

The PE section 106 is marked by the characters "PE" and holds a data structure 110 containing basic information about the file 100. The data structure 110 holds many data fields describing various aspects of the file 100.

The next section 112 holds the section table 114. The section table 114 contains information about each section in the file 100, including the section's type, size, and location in the file 100. For example, entries in the section table 114 indicate whether a section holds code or data, and whether the section is readable, writeable, and/or executable. Each entry in the section table 114 describes a section that may have multiple, one, or no entry points.

The text section 116 holds general-purpose code produced by the compiler or assembler. The data section 118 holds global and static variables that are initialized at compile time.

The export section 120 contains an export table 122 that identifies functions exported by the file 100 for use by other programs. An EXE file might not export any functions but DLL files typically export some functions. The export table 122 holds the function names, entry point addresses, and export ordinal values for the exported functions. The entry point addresses typically point to other sections in the file 100. Each exported function listed in the export table 122 is an entry point into the file 100.

The import section 124 has an import table 126 that identifies functions that are imported by the file 100. Each entry in the import table 126 identifies the external DLL and the imported function by name. When code in the text section 116 calls a function in another module, such as an external DLL file, the call instruction transfers control to a JMP instruction also in the text section 116. The JMP instruction, in turn, directs the call to a location within the import table 126. Both the JMP instruction and the entries in the import table 126 represent entry points into the file 100.

Figure 2:
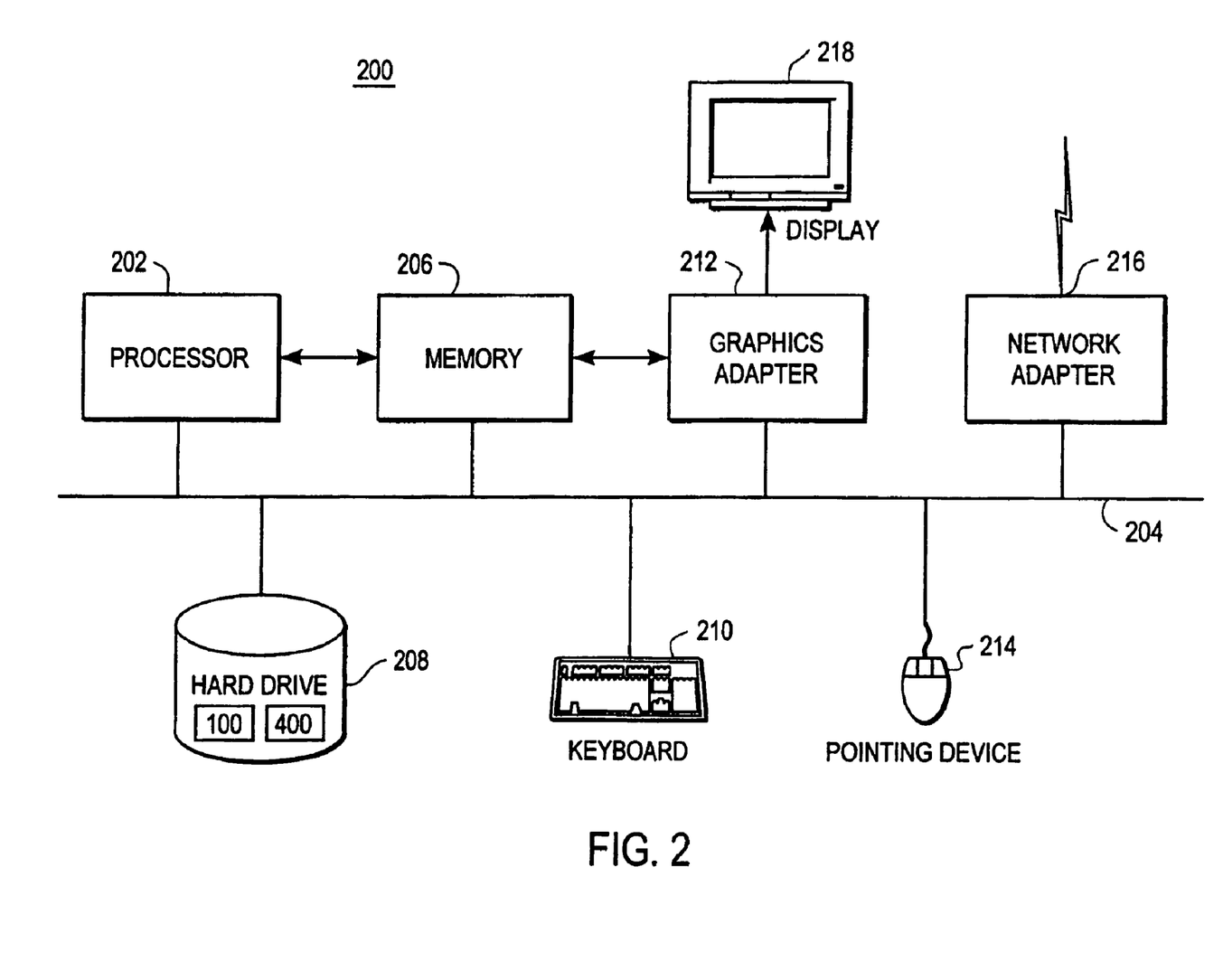
FIG. 2 is a high-level block diagram illustrating a computer system 200 for executing a virus detection system (VDS) 400.

FIG. 2 is a high-level block diagram of a computer system 200 for storing and executing the host file 100 and a virus detection system (VDS) 400. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. As is known in the art, the processor 202 has multiple registers that are used to hold instructions, data, addresses, and other information. The storage device 208 may be any device capable of holding data, like a hard drive, compact disk read-only memory (CD-ROM), DVD, or a solid-state memory device. As is known in the art, the storage device 208 typically holds multiple files of different types, including potential virus host files like those described by FIG. 1. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, the computer system 200 is adapted to execute computer program modules for providing functionality described herein. As used herein, the term "module" refers to computer program logic utilized to provide the specified functionality. Thus, a module can be implemented in hardware, firmware, and/or software. Preferably, program modules providing the functionality of the VDS 400 are stored on the storage device 208.

Figure 3:
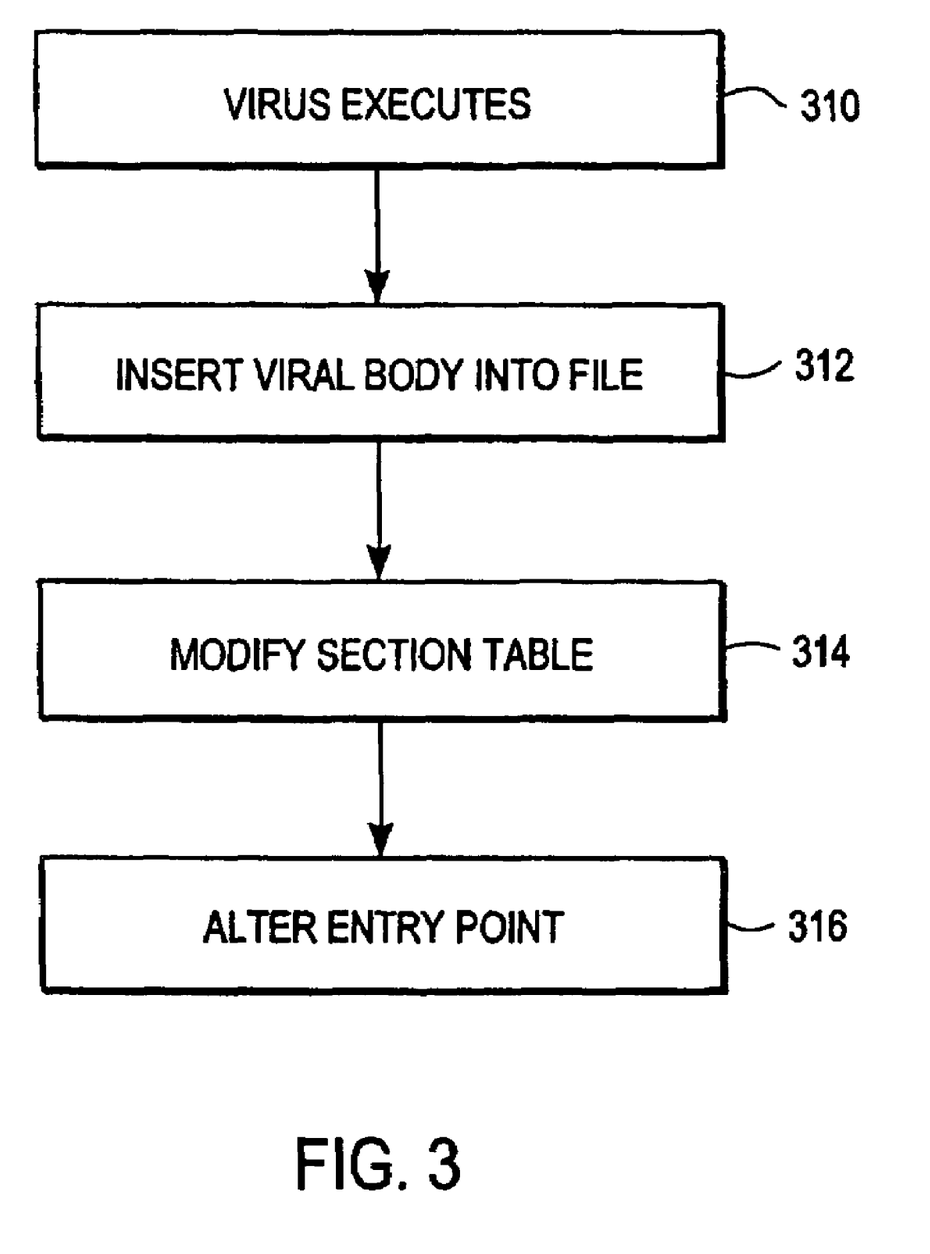
FIG. 3 is a flowchart illustrating steps performed by a typical metamorphic virus when infecting a host file 100.

FIG. 3 is a flowchart illustrating steps performed by a typical polymorphic virus when infecting the host file. The illustrated steps are merely an example of a viral infection and are not representative of any particular virus. Initially, the virus executes 310 on the computer system 200. The virus may execute, for example, when the computer system 200 executes or calls a function in a previously infected file.

The virus identifies 312 a new host file to infect. For example, the virus may search for files matching the string "*.EXE" to identify new host file candidates. The virus then filters the candidate files to identify a particular new host file 100. The files may be filtered based on the files' sizes, names, whether the files are already infected by the virus, etc.

The virus inserts 314 its viral code into the new host file. For example, the virus can append the viral body to the slack space at the end of a section or put the viral body within an entirely new section. During this step, the virus uses one or more techniques to modify its current viral code to produce new viral code, which it then inserts into the file 100. The techniques the virus can use to modify its code include encryption inserting and/or removing jump ("JMP") and no-operation ("NOP") instructions, substituting varying sets of equivalent instructions for performing certain tasks, such as register subtractions or zeroing, and/or substituting the registers utilized by certain instructions, etc. If the virus is a polymorphic virus, the modified code can form the decryption engine that the virus utilizes to decrypt its viral body. If the virus is a metamorphic virus, the modified code can form the viral body itself. In addition, some viruses can modify code forming both the decryption engine and the viral body.

The virus typically modifies 316 the section table 114 in the host file 100 to account for the added viral code. For example, the virus may change the size entry in the section table 114 to account for the added viral code. Likewise, the virus may add entries for new sections added by the virus. If necessary, the virus may mark an infected section as executable and/or place a value in a little-used field to discreetly mark the file as infected and prevent the virus from re-infecting the file 100.

In addition, the virus typically also alters 318 an entry point of the host file 100 to call the viral code. The virus may accomplish this step by, for example, overwriting the value in the field 104 holding the relative offset to the start 108 of the PE section 106 with the relative offset to virus code stored elsewhere in the file. Alternatively, the virus can modify entries in the export table 122 to point to sections of virus code instead of the exported functions. A virus can also modify the destination of an existing JMP or CALL instruction anywhere in the file to point to the location of viral code elsewhere in the file, effectively turning the modified instruction into a new entry point for the virus.

A particularly sophisticated virus can use very complex techniques for infecting the host file that differ in some respects from the ones described above. For example, one sophisticated virus includes a disassembly engine in its viral body and uses it to disassemble the host file into its smallest elements. Then, the virus infects the dissembled host file by moving code blocks to clear space for the viral code, inserting its modified viral body, regenerating code and data references, including relocation information, and then rebuilding the file. Another sophisticated virus detects whether a compiler is present on the host computer system 200. If a compiler is present, the virus uses it to recompile a slightly modified version of the virus's source code and thereby generate a completely new viral body. Then, the virus inserts the new viral body into the host file. Other viruses can use techniques in addition to, or instead of, the ones described herein to modify the viral bodies and insert the bodies into host files.

Figure 4:
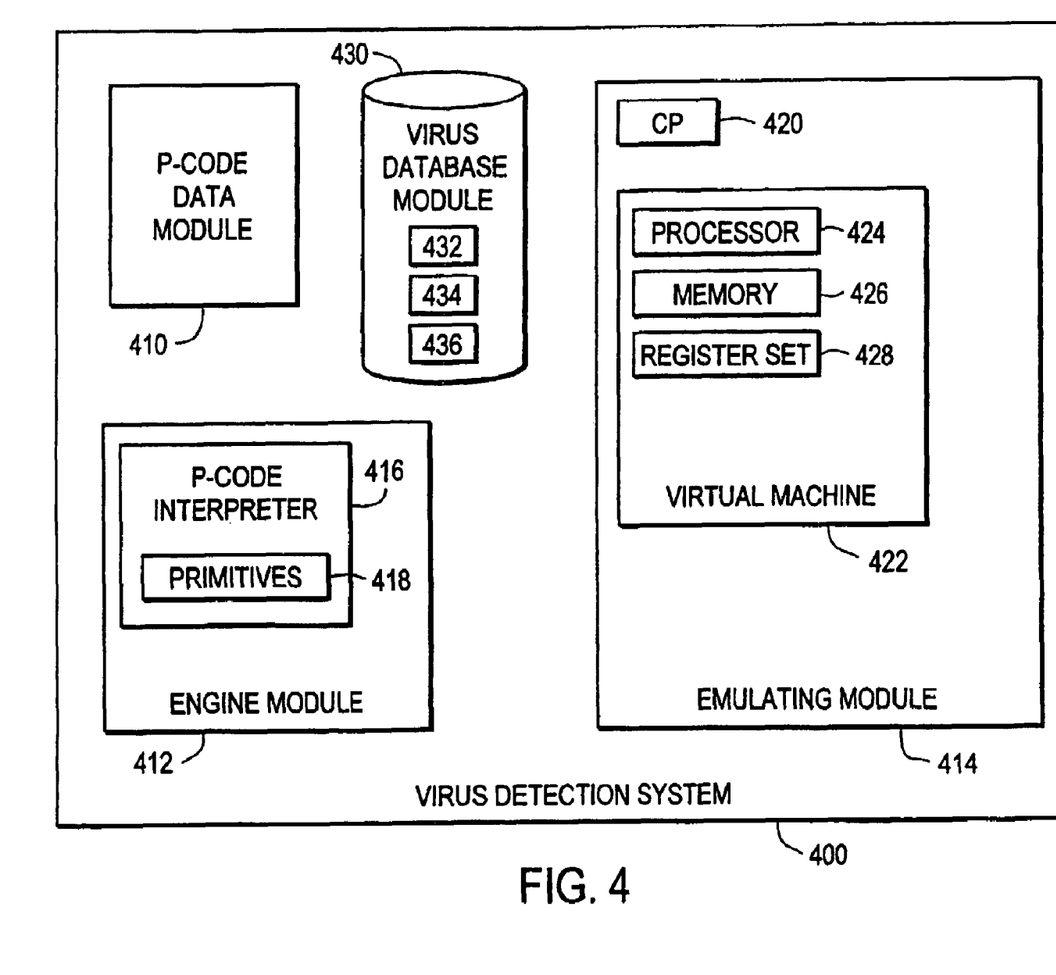
FIG. 4 is a high-level block diagram illustrating modules of the VDS 400 according to one embodiment.

FIG. 4 is a high-level block diagram illustrating modules of the VDS 400 for detecting the presence of a virus in a host file or elsewhere in the computer system 200 according to an embodiment of the present invention. FIG. 4 illustrates only certain modules of the VDS 400 and it will be understood that some embodiments may include other modules not described herein. In addition, embodiments may lack modules described herein and/or distribute the described functionality among the modules in a manner different than described herein.

The VDS 400 includes a P-code data module 410, an engine module 412, an emulating module 414, and a virus database module 430. The P-code data module 410 preferably holds P-code instruction modules for controlling the operation of the VDS 400 to detect the presence of a virus. As used herein, "P-code" refers to program code for providing data-driven functionality to the VDS 400. Preferably, a virus researcher creates the P-code instructions in the data module 410 by writing instructions in any computer language and then compiling the instructions into P-code. In addition, the functionality of the P-code can be replaced by other data-driven techniques. For example, the program code can be stored in a representation other than P-code or a state machine can be utilized in combination with, or as an alternative to, the P-code in order to provide deterministic data-driven virus detection.

An embodiment of the VDS 400 uses data-driven techniques to control its operation because such techniques allow the functionality of the VDS to be changed by updating the P-code and/or other data. For example, the VDS 400 can be updated to detect new viruses by updating the P-code instead of the other modules. Accordingly, the use of data-driven techniques simplifies the task of updating thousands or millions of VDSs 400 that are installed on computer systems "in the field." However, alternate embodiments of the VDS 400 implement the described functionality through non-data-driven techniques.

The engine module 412 preferably controls the operation of the VDS 400 in response to the P-code in the P-code data module 410. The engine 412 preferably contains a P-code interpreter 416 for interpreting the P-code, which in turn controls the operation of the engine 412. In alternative embodiments where the data module 410 holds instructions in a format other than P-code, the engine 414 is equipped with a module for interpreting or compiling the instructions in the relevant format.

The P-code interpreter 416 preferably includes special P-code function calls called "primitives" 418. The primitives 418 can be, for example, written in P-code or a native language, and/or integrated into the interpreter 416 itself. Primitives 418 are functions useful for examining the host file and virtual machine 422 that can be called by other P-code. For example, the primitives 418 perform functions such as opening files for reading, closing files, zeroing out memory locations, truncating memory locations, locating exports in the file, determining the type of the file, and finding the offset of the start of a function. The functions performed by the primitives 418 can vary depending upon the computer or operating system in which the VDS 400 is being used. For example, different primitives may be utilized in a computer system running the MACINTOSH operating system than in a computer system running a version of the WINDOWS operating system. In an alternative embodiment, some or all of the primitives can be stored in the P-code data module 410 instead of the interpreter 416.

The emulating module 414 is preferably adapted to execute computer program instructions in the host file in a virtual machine under the direction of the engine module 412. The emulating module 414 includes a control program (CP) module 420 for setting up a virtual machine 422 having a virtual processor 424, a virtual memory 426, and a set of virtual registers 428 (typically part of the virtual processor). The virtual machine 422 can emulate a 32-bit MICROSOFT WINDOWS environment, an APPLE MACINTOSH environment, or any other hardware and/or software environment for which emulation is desired. The virtual machine 422 uses the virtual processor 424 to execute the instructions in the virtual memory 426 in isolation from the actual hardware and software on the computer system 200. Thus, a virus or other malicious code executed by the emulating module 414 cannot contaminate the computer system 200.

Depending upon the embodiment, there may be one or more computer program instructions that the emulating module 414 is unable to emulate. For example, in one embodiment the emulating module 414 emulates a subset of the computer program instructions available on the INTEL 80x86 processor family. If the emulating module 414 encounters an instruction which it cannot emulate, it typically skips over the instruction. Other embodiments of the emulating module 414 can act in a different way when the embodiments encounter a non-emulated instruction.

The virus database module 430 preferably stores data utilized by the VDS 400 to determine whether a file is infected by a virus. In one embodiment, the virus database module 430 stores data describing the known viruses that can be detected by the VDS 400. For each virus, the database module 430 preferably stores data 432 describing the infection characteristics of the virus, data 434 describing how to detect the presence of the virus, and data 436 describing how to repair a file infected with the virus (if possible). In one embodiment, the virus database module 430 also stores other data, such as data representing characteristics that can be utilized to detect unknown viruses.

In one embodiment, the infection characteristics 432 stored by the virus database module 430 include the markers left by viruses to indicate that a virus has infected a file. Typically, viruses leave such markers in a file to avoid re-infecting the same file. However, the markers may also occur naturally and, therefore, cannot be solely relied upon to indicate the presence of a virus. The infection characteristics 432 also describe the types of files infected by the viruses, how the viruses infect the files, etc. These characteristics are preferably utilized by the file selection module 510, described in more detail below, to determine whether a file potentially hosts a virus.

In one embodiment, the data 434 in the virus database module 430 describe how to detect the presence of a virus based on register values. As described above, some viruses do not have fixed sequences of instructions that can be utilized to detect the virus. Still, such viruses typically achieve instruction polymorphism by replacing instructions with one or more different instructions for performing the same functions. Therefore, a given code block of a virus (e.g., a function, routine, or arbitrary section of code in the virus) will act on a fixed set of inputs to produce a fixed set of outputs. The set of inputs is typically defined by the contents (i.e., state) of the registers.

Consider a virus that has the following instructions in a first generation:
MOV BP, 9090
MOV AX, 9192
XOR BX, BX
PUSH AX The first two instructions place the values 9090 and 9192 in registers BP and AX, respectively. The third instruction sets the value of the BX register to zero, and the fourth instruction pushes the value 9192 onto the stack.

Assume that a second generation of this virus changes the instructions performing these functions to:
MOV BP, B0A0
SUB BP, B0A2
ADD BP, 9194
SUB BP, 102
MOV AX, 9092
ADD AX, 100
XOR BX, BX
PUSH AX These instructions are quite different from the instructions in the first generation of the virus. Nevertheless, these instructions accomplish the exact same tasks as the first generation instructions, namely placing the value 9090 in register BP, zeroing the value of register BX, and pushing the value 9192 on the stack from register AX.

Although both generations of the virus in this example use the same registers, other viruses may change the registers used by different generations. However, all generations of the same virus will typically store the same values in the same order if given the same set of inputs. Accordingly, the initial values of the registers at a given point in the viral code, the values the virus stores in the registers, and/or the order in which the virus stores the values can be utilized to detect the presence of the virus.

For purposes of this description, the actions that a virus performs on a set of registers, such incrementing, decrementing, or storing a new value in one or more registers, the order that the actions are performed, and/or the initial state of the registers are referred to as the virus's "register signature." The register signature is preferably developed by virus researchers who analyze the functional behavior of the virus and identify a signature that is indicative of the presence of the virus.

The register signature differs from the traditional "signature" utilized by traditional anti-virus software because the register signature identifies an initial register state and/or actions performed by the viral code, while the traditional signature identifies the viral code itself. In an embodiment, however, a register signature can also specify one or more opcodes that may be present in the viral code or otherwise executed by the virus in order to provide flexibility in fine-tuning the register signatures to identify particular viruses. An "opcode" is the first few bytes of an instruction that typically denote the type of instruction, but do not necessarily denote other information about the instruction, such as its operands. However, the techniques described herein can be equally applied to both the opcodes and entire instructions, and thus it will be understood that embodiments described herein as using opcodes can also use entire instructions and/or other parts of instructions, and vice-versa. For example, a register signature can specify the signature using opcodes, entire instructions, or some other portion of an instruction.

In one embodiment, the virus database module 430 represents a register signature for a virus as an initial state of one or more registers 428 of the virtual machine 422 and/or a list of one or more predicates that the virus is expected to satisfy. In one embodiment, the entries in the predicate list are preferably in sequential order, meaning that the virus is expected to satisfy an earlier-listed predicate before satisfying a later predicate.

For example, in one embodiment, the register signature for the sample virus described above is as follows:

[REGISTER_SIGNATURE_BEGIN]
    regBP = 9090
    regAX = 9192
    regBX=0
[REGISTER_SIGNATURE_END]

In this example, the labels "[REGISTER_SIGNATURE_BEGIN]" and "[REGISTER_SIGNATURE_END]" respectively indicate the beginning and end of the signature. The entries in between the labels each contain a predicate. In this example, each predicate specifies a particular register and a value that the register must contain in order to satisfy the predicate. The registers in this example are BP, AX, and BX and the respective values are 9090, 9192, and 0. Thus, this register signature matches the sample virus described above.

Since viruses can change the registers used by the instructions, an embodiment allows predicates to specify registers with wildcards. In addition, an embodiment also allows a predicate to specify multiple equivalent register values. For example, consider the following register signature:

[REGISTER_SIGNATURE_BEGIN]
    regBP = 9090, regSP=9090
    regAX = 9192, regBX=1234
    regBX=0, regCX=0
    reg?? = 5678
[REGISTER_SIGNATURE_END]

In this signature, the first predicate is satisfied if register BP or register SP contains the value 9090. The second predicate is satisfied if register AX contains the value 9192 or if register BX contains the value 1234. The third predicate is satisfied if either register BX or register CX contains the value of zero. The last predicate specifies a register using a wildcard, "??," and is satisfied if any register contains the value 5678.

In one embodiment, a register signature can use wildcards and logical expressions to specify the values stored in the registers. For example, a predicate can state "regBX!=0," meaning that the predicate is satisfied if the value of register BX is not zero, or "regBX=0 & regCX=1234," meaning that the predicate is satisfied if the value of register BX is zero and the value of register CX is 1234. Similarly, a predicate can state "regCX=F??A," meaning that the predicate is satisfied if register CX contains a value beginning with "F" and ending with "A." A register signature can also state that a predicate is satisfied if one of multiple values are in a register. For example, the predicate "regBX=0011, A00D" is satisfied if register BX contains the value 0011 or the value A00D.

In addition, a register signature can also specify relative changes to the value in a register. For example, a register signature can specify that a value is decremented and/or incremented with respect to its initial value at the start of a code block.

In one embodiment, the register signature specifies initial values for virtual registers 428 in a manner similar to how predicates are specified. In one embodiment, a section within the register signature and identified with beginning and ending tags specifies the initial values using statements like "regCX=1234" to assign the value "1234" to register CX. Another embodiment utilizes special commands that can be located anywhere within the register signature to specify register values, such as "initial regCX=1234."

In one embodiment, register signatures specify opcodes in the same manner that the signatures specify registers. For example, a register signature can state "OPCODE=8B1A," meaning that the predicate is satisfied if the opcode executed by the processor is 8B1A. Further variations of register signatures will be apparent to those of skill in the art.

The virus database 430 preferably contains register signatures and additional data specifying how to use the register signatures to detect viruses in files. In one embodiment, these data include emulation parameters specifying how to emulate the computer program instructions in order to make viruses apparent. Depending upon the embodiment and/or virus, these parameters may also specify the initial state of the virtual machine 422, the start point or points in the host file from which to begin emulation, the number of instructions to emulate, how to respond to a breakpoint or exception, virtual registers to track for correspondence with register signatures, etc. Some or all of this information can be specified as default values.

The data 436 in the virus database module 430 describing how to repair infected files are typically highly-specific to the type of virus. Preferably, these data are developed by virus researchers who study the viruses and identify ways to return infected files and computer systems to their original states. Some viruses damage files and/or computer systems beyond repair, and the data in the database module 430 preferably indicate if this is the case.

Figure 5:
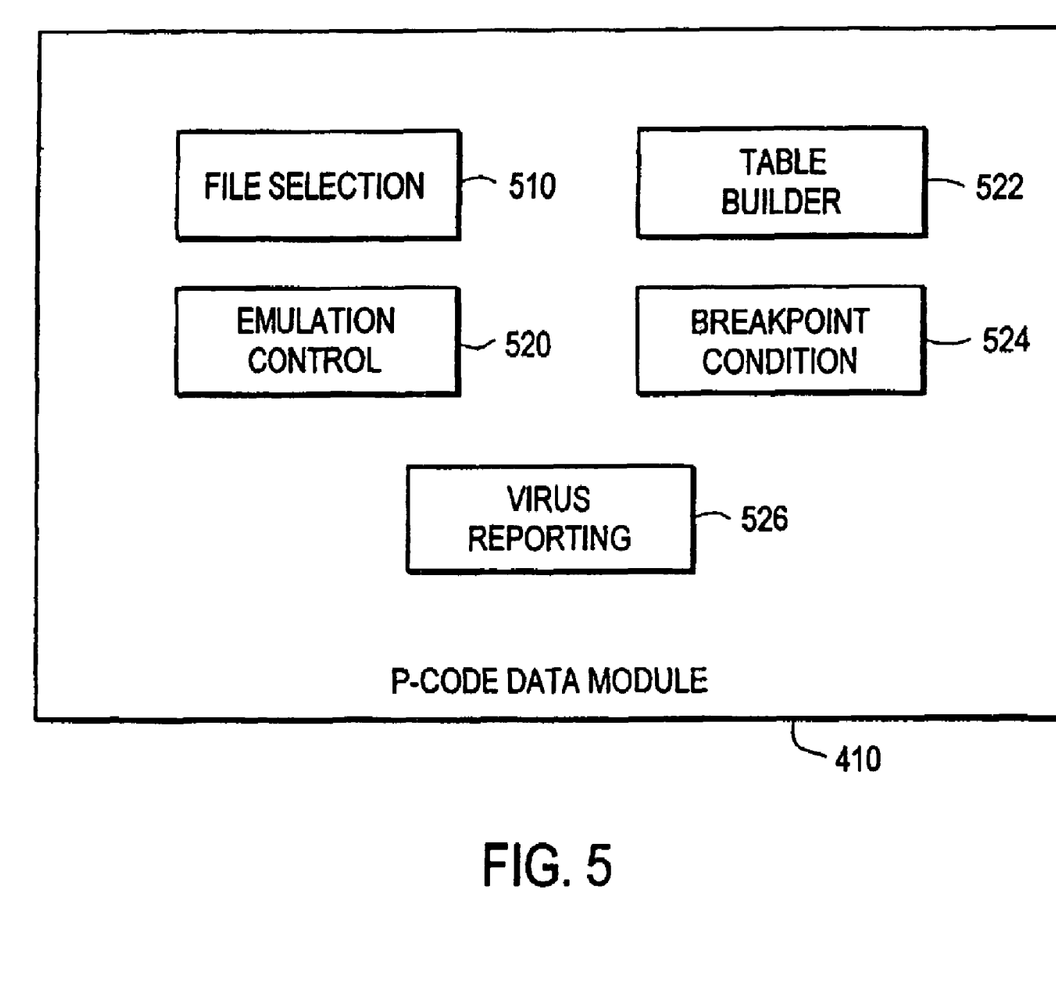
FIG. 5 is a high-level block diagram illustrating a more detailed view of the P-code data module 410 in the VDS 400.

FIG. 5 is a high-level block diagram illustrating a more detailed view of the P-code data module 410. Embodiments of the P-code data module 410 may contain additional or different modules than those described with respect to FIG. 5 and the functionality may be distributed among the modules in a different manner than is described herein.

A file selection module 510 contains P-code for selecting a potential host file on the computer system 200 to examine for the presence of a virus. In general, the file selection module 510 filters the files on the computer system 200 to select only files that are susceptible to infection by a virus. In one embodiment, the file selection module 510 performs one or more tests on each file, and only those files that pass each test are designated "susceptible to infection by a virus." The tests can include, for example, determining whether the file contains executable instructions (e.g., whether the file has a ".EXE" or ".DLL" extension), whether the file is a PE file, whether the file contains a marker that is consistent with infection by a known virus, whether the size of the file is suspicious, whether the internal characteristics of the file indicate a possible viral infection, etc.

In one embodiment, other modules in the VDS 400 are adapted to identify files on the computer system 200 and utilize the file selection module 510 to determine whether the file is susceptible to infection. For example, the other modules may be configured to detect when a file on the storage device 208 is accessed and then activate the file selection module 510 to process the file. In another example, the other modules may be configured to recursively search for files on the storage device 208 and utilize the file selection module 510 to examine each encountered file. In another embodiment, the functionality described in these two examples is provided by the file selection module 510 itself.

The P-code data module 410 includes an emulation control module 520. This module 520 contains code for identifying and selecting potential virus entry points in the file and emulating certain instructions in the file at or near each selected point. Although in one embodiment the emulation control module 520 selects only certain locations in the file as potential entry points, another embodiment of the module treats every instruction in the file, or every instruction within certain regions of the file, as potential entry points. The emulation control module 520 accesses the virus database module 430 to determine the parameters for the emulations and interacts with the control program 420 in the emulating module 414 in order to perform the emulations according to the parameters. In one embodiment, the emulation control module 520 holds the emulation parameters instead of the virus database 430.

In one embodiment, the P-code data module 410 also includes a table builder module 522. This module 522 contains code for building a table tracking the state of the virtual registers 428 and/or the opcodes during a given emulation of instructions. In an embodiment, the table tracks only a subset of the virtual registers and the opcodes. The subset of registers to track is specified by data stored in the virus database 430, although other embodiments may use other techniques to specify the registers. The VDS 400 stores the table in the emulation module 414 or another location in the computer system 200 where the table is accessible to the modules in the VDS.

Figure 6:
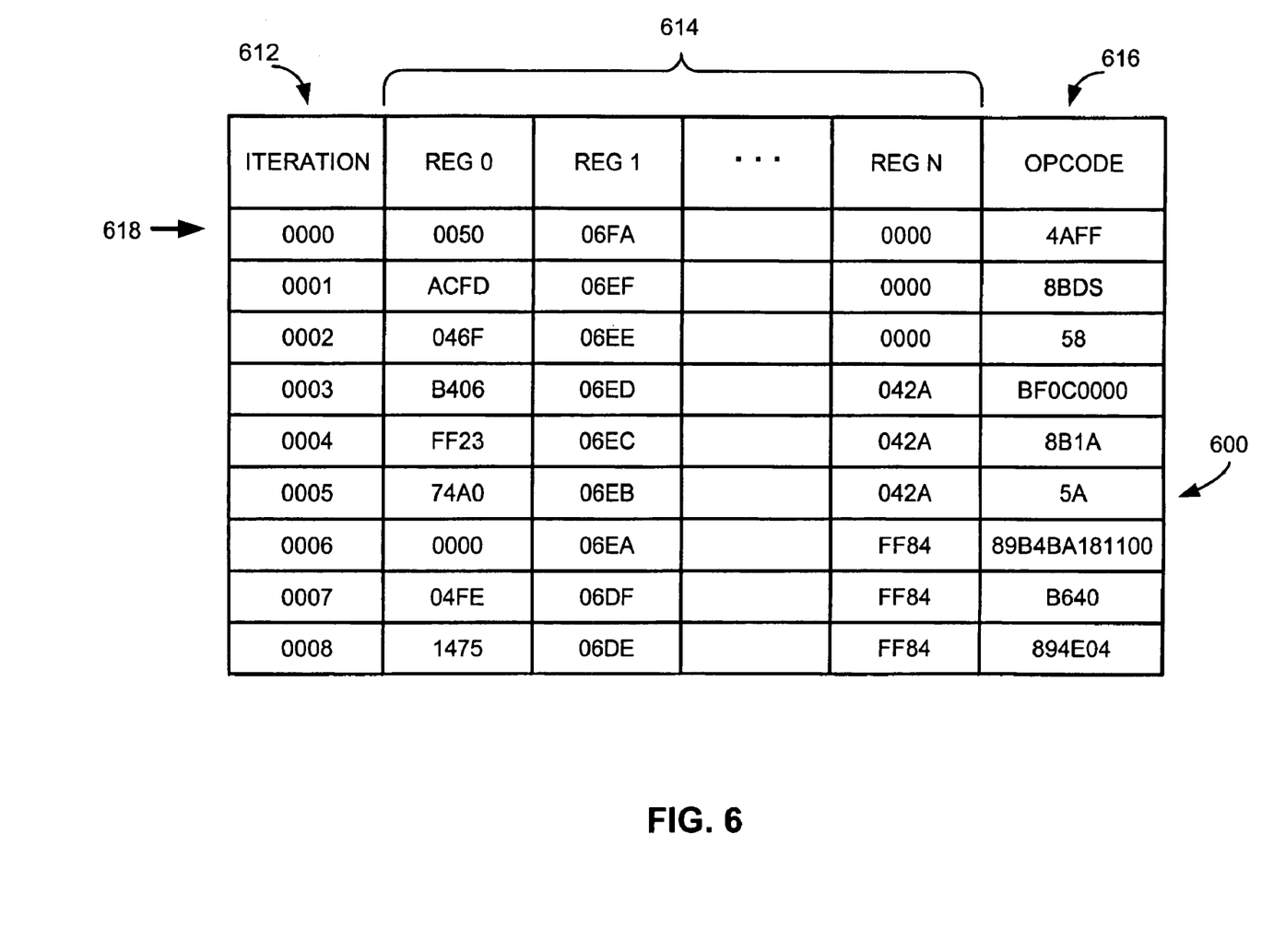
FIG. 6 illustrates an example of a register table 600 according to one embodiment.

FIG. 6 illustrates an example of a register table 600 according to an embodiment of the present invention. The table 600 has a column 612 counting the emulation iterations (i.e., counting the number of instructions emulated by the virtual machine 422). In one embodiment, this column 612 simply maintains a count of the emulated instructions. In another embodiment, the column 612 tracks the value of the virtual instruction pointer register at each step of the emulation.

The table 600 also includes one to N columns 614 tracking the values in the specified virtual registers 428 at each step of the emulation. The first row 618 of the illustrated table 600 shows the initial state of the virtual registers for the code block being emulated. These initial values are specified by the register signature or by other data within the VDS 400. In one embodiment, virtual registers not having specified initial values are given a value of zero. The instructions emulated by the virtual machine 422 cause the registers to hold different values in subsequent iterations. Another column 616 in the table 400 specifies the opcode of the instruction executed by the virtual machine 422 at each iteration.

Although the virtual registers in the illustrated table 600 hold 32 bits, in real-world embodiments the amount of data held by the entries in each column can vary depending upon the data being tracked by the column. For example, the entries in columns associated with particular virtual registers preferably hold amounts of data equal to the widths of the associated registers. The values illustrated in the entries the table 600 of FIG. 6 are merely examples, and are not representative of a particular emulation of the virtual machine 422.

The overall size of the table 600 depends upon the particular embodiment of the present invention. In one embodiment, the total size of the table is less than 64K. In one embodiment, if the number of iterations exceeds the number of rows in the table, the table builder module 522 wraps back to the start of the table 600 and continues to fill the table entries.

Returning to FIG. 5, the P-code data module 410 also preferably includes a breakpoint condition module 524. This module 524 preferably specifies breakpoints and other stopping conditions for the emulation. Preferably, the emulation control module 520 utilizes the breakpoint condition module 524 to stop the emulation at certain points.

In one embodiment, the breakpoint condition module 524 specifies a number of instructions that should be emulated before stopping. In one emobdiment, the breakpoints are configured to stop emulation after relatively few instructions. For example, in one embodiment a breakpoint stops emulation after 50-500 instructions. In contrast, typical emulation-based virus detection software may emulate over 1 million instructions before reaching a breakpoint.

In another embodiment, the breakpoint condition module 524 specifies a virtual machine state at which emulation should stop. In still another embodiment, the module 524 specifies a combination of factors for determining whether to stop emulation. For example, the breakpoint condition module 524 can specify that emulation should stop if more than 75 instructions were emulated and the BP register holds the value "9090." In another example, the breakpoint condition module 524 can specify that a breakpoint should occur every 100 instructions, until the total number of emulated instructions exceeds a specified maximum.

In one embodiment, the breakpoint condition module 524 stores separate breakpoint conditions for certain host files and/or viruses. For example, in one embodiment the module 524 stores breakpoint conditions to be utilized when the file is in the standard MICROSOFT WINDOWS distribution. Similarly, in one embodiment the module 524 stores breakpoint conditions to be utilized when the VDS 400 is checking for the presence of a particular virus. In one embodiment, the breakpoint condition module 524 also stores default breakpoints for use when there are no specific breakpoint conditions for a given file and/or virus.

The P-code data module 410 also preferably includes a virus reporting module 526 storing code for detecting the presence of a virus in the file. Preferably, the virus reporting module 526 analyzes the table 600 created by the table builder module 522 to determine whether it matches a register signature stored in the virus database module 430. In one embodiment, the table 600 matches a register signature if it indicates that every predicate in the register signature is satisfied when the emulation is performed using the specified initial state.

If the virus reporting module 526 matches a register signature with the data in the table 600, the module preferably reports this information to the VDS 400. If the virus reporting module 526 does not match a register signature with the data in the table 600, the module preferably reports this negative result to the VDS 400. The VDS 400 can treat a positive report as evidence that the file is infected with a virus, or it can treat the report as one variable in a multi-variable decision process. For example, in one embodiment, a matching register signature is a secondary characteristic used to reduce false positives and is not, in itself, dispositive of whether a file contains a virus. In response, other modules in the VDS 400 preferably perform actions such as notifying the computer user of the virus, quarantining the file, and attempting to repair the infected file and/or computer system.

Figure 7:
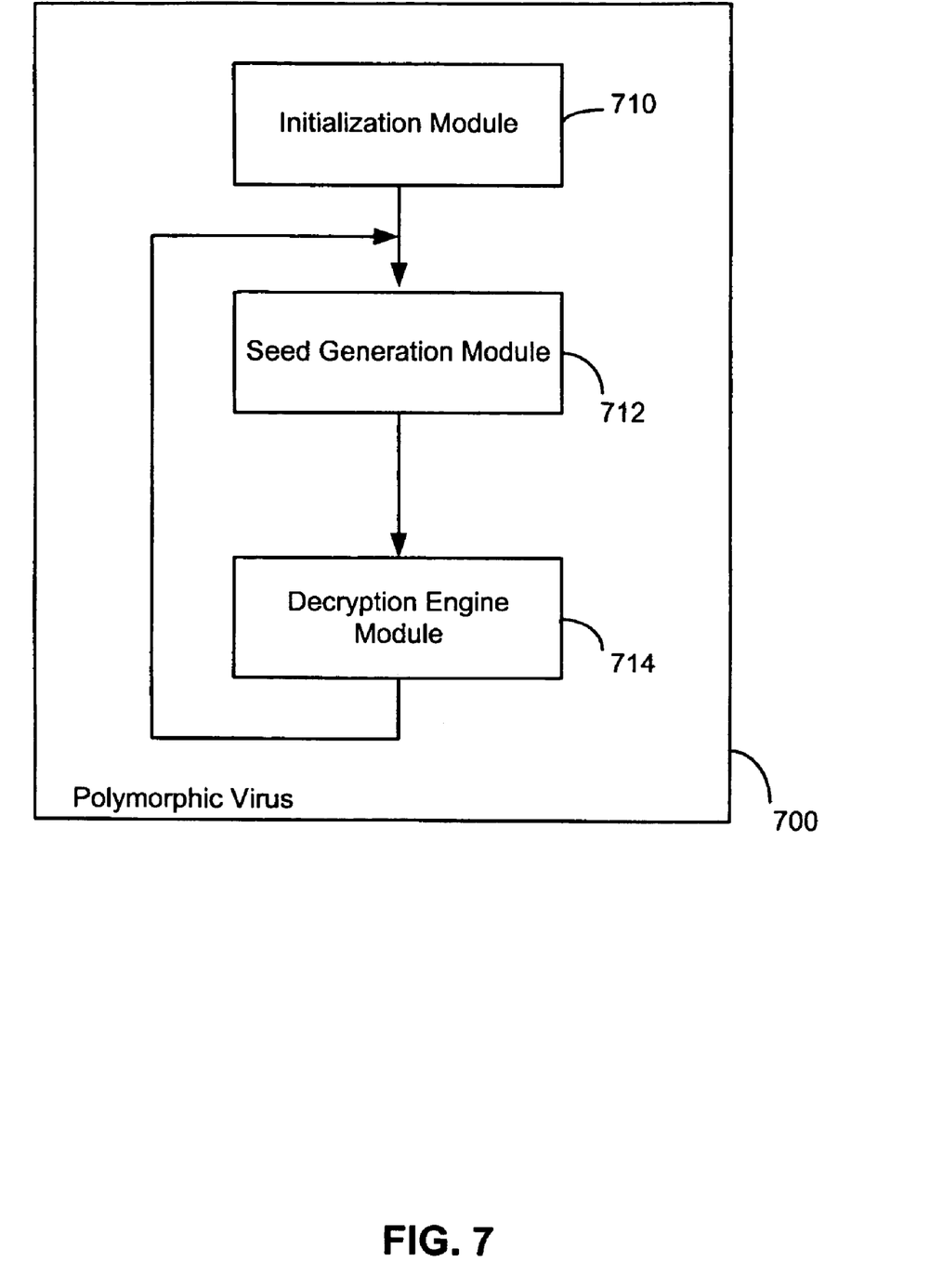
FIG. 7 is a block diagram showing the functional modules within a typical polymorphic virus 700.

FIG. 7 is a block diagram showing the functional modules within a typical polymorphic virus 700. The illustrated virus 700 is not necessarily representative of any specific virus, but rather illustrates common characteristics of polymorphic viruses. Real-world viruses may omit modules described herein include additional modules, and/or distribute the functionality among the products in a different manner. The virus 700 includes an initialization module 710 that sets the initial machine state for the virus. For example, the initialization module can set a register with an initial value that acts as a loop counter. One real-world virus sets the ECX register to 0x200 and uses this value as the loop counter.

The polymorphic virus 700 also includes a seed generation module 712 and a decryption engine module 714. The seed generation module 712 generates a seed value (e.g., a decryption key) and supplies the seed to the decryption engine module 714. The decryption engine module 714 uses the seed to decrypt the viral body. Typically, the decryption engine module 714 utilizes multiple iterations of a loop to decrypt the viral body. With each iteration, control flow passes back to the seed generation module 712, which thereby generates a new seed for each iteration of the loop.

In addition, the decryption engine module 714 typically decrements the value in the loop counter register with each iteration.

Figure 8A:
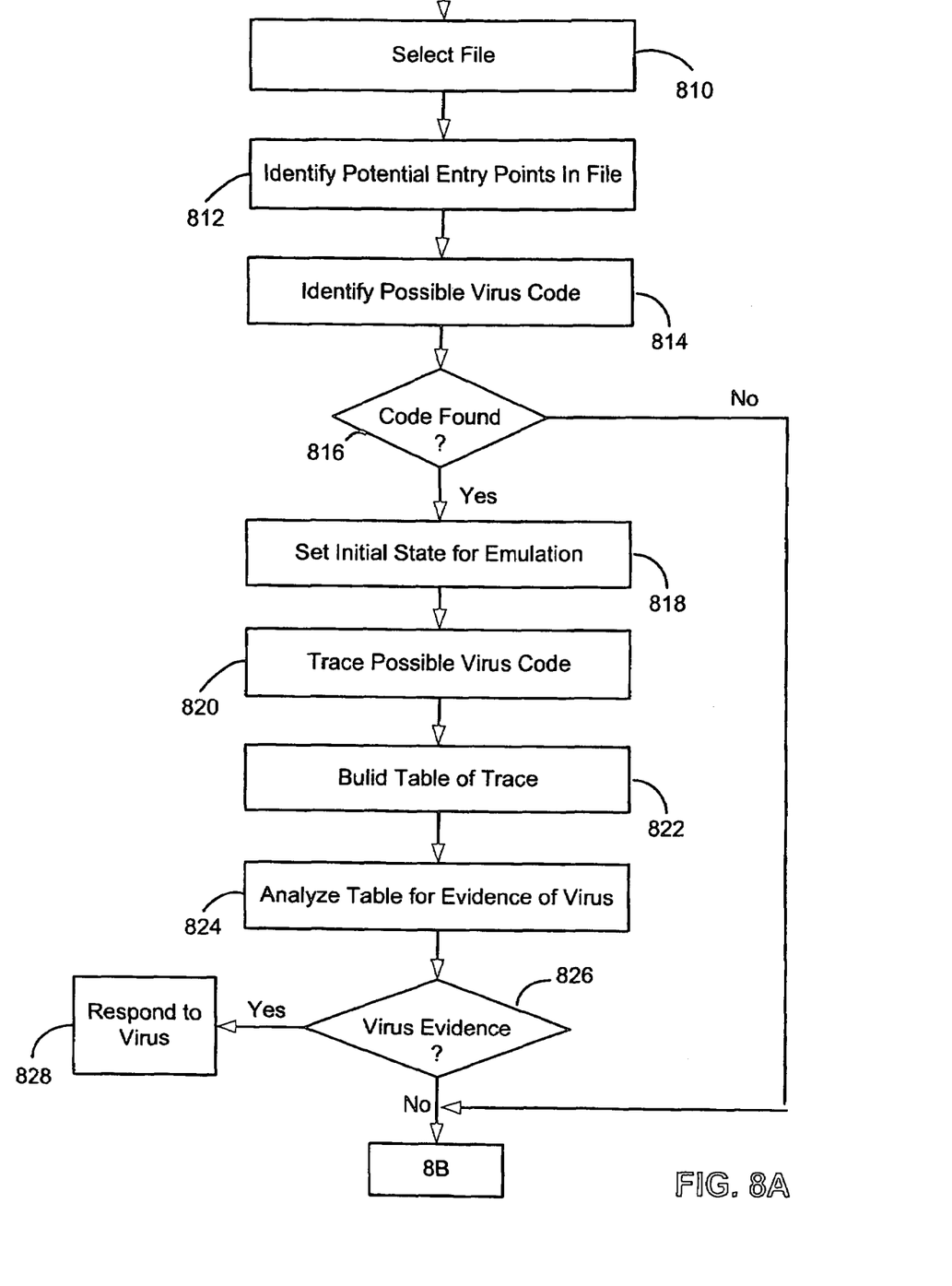
Figure 8B:
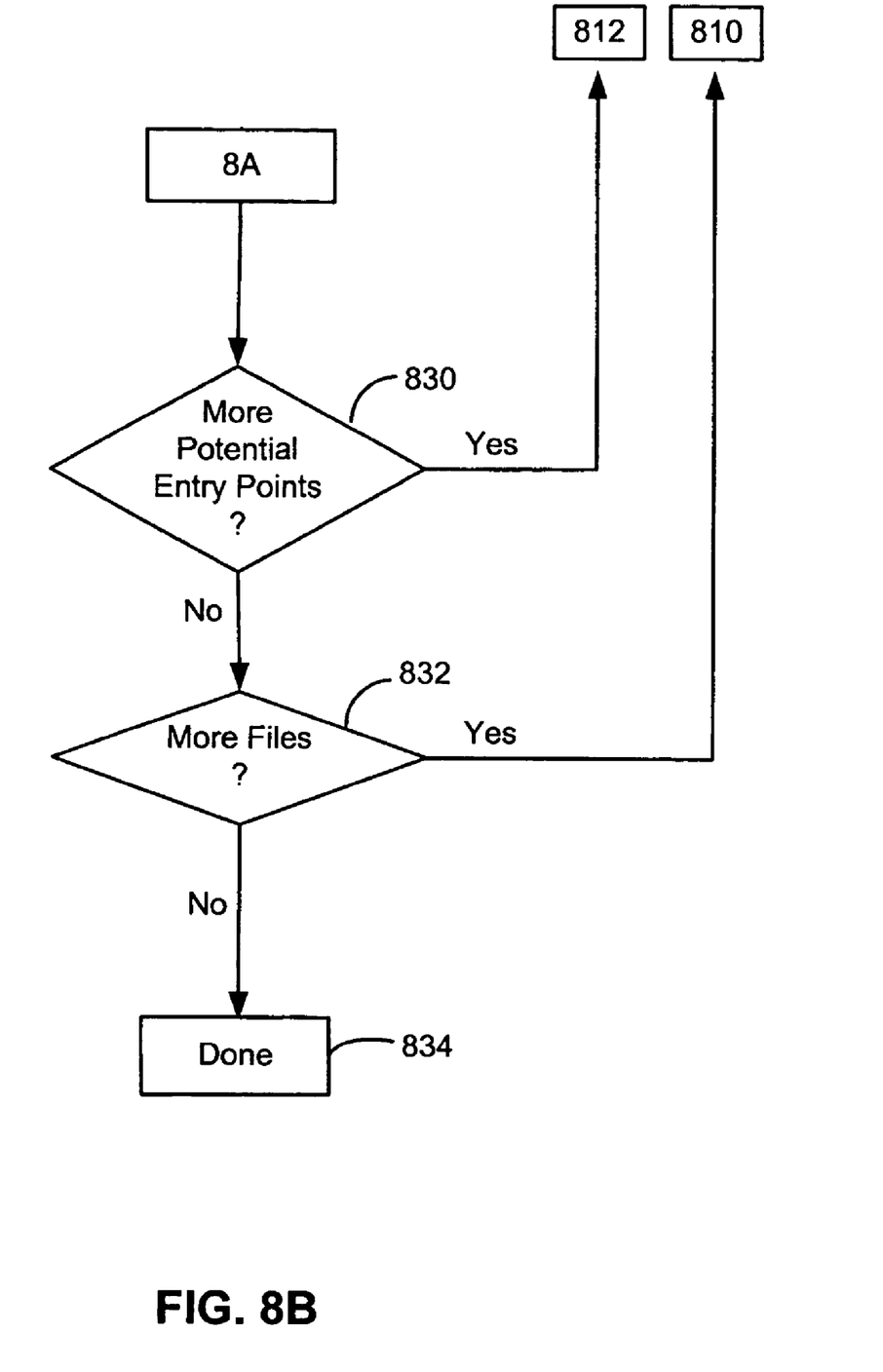

FIGS. 8A-8B depict flowcharts illustrating one embodiment of the operation of the VDS 400 to detect the presence of a virus such as the virus illustrated in FIG. 7. In one embodiment, P-code for enabling the VDS 400 to operate in the described manner is stored in the P-code data module 410. Since the operation is data-driven, other embodiments may perform different or additional steps than those described herein. In addition, the steps may be performed in different orders.

The VDS 400 examines the files on the computer system 200 to identify those files that are susceptible to infection by a virus. In one embodiment, the VDS 400 selects 810 a single file for further examination. Alternatively, the VDS 400 receives a reference to a file from another module executing on the computer system 200 and subjects this file to further examination.

The VDS 400 examines the selected file in order to identify 812 potential entry points for a virus. As described above, there are many locations in the file that viruses can exploit as entry points. The VDS 400 selects one of the entry points and searches at or near the entry point to identify 814 an opcode or series of opcodes that are characteristic of a possible virus infection.

In one embodiment, the virus obscures its entry point using polymorphism or other techniques, thereby making it difficult to identify the exact opcode that represents the starting point for the virus code. However, in such cases it is often possible to identify an opcode or series of opcodes that are known to be within the virus. For example, in at least one polymorphic virus, the last opcode of the decryption engine module 714 is constant (it performs a jump back to the seed generation module 712).

If 816 the VDS 400 does not identify any opcodes that are characteristic of a virus, it examines 824 the next entry point, if any. If 816 the VDS 400 does identify one or more opcodes that are characteristic of a virus, one embodiment sets 818 the initial state of the virtual machine 422 as specified by a register signature or by data elsewhere in the VDS. In one embodiment, the initial state represents an approximation of the contents of the registers 428 had the instructions preceding the identified opcode actually executed. In one embodiment, the VDS 400 loads a value representing a loop iteration counter into a virtual register known to be used as a loop counter by a certain virus, thereby mimicking the functionality of the virus's own initialization module 710. In one embodiment, the initial state set by the VDS 400 includes "dummy" values in registers that are known to be unused by a particular virus. For example, if it is known that a particular virus does not use the EAX register, one embodiment of the VDS 400 places a dummy value, such as "0xDEADBEEF" in that register. In one embodiment, the initial state set by the VDS 400 includes setting certain registers to zero.

Once the initial state is set, the VDS 400 emulates 820 the instructions starting with the instruction having the opcode characteristic of a virus. The VDS 400 also builds 822 a register table tracking the contents of certain virtual registers 428 as the instructions are emulated. If the VDS 400 encounters a non-emulated instruction, one embodiment skips over the instruction. The VDS 400 continues to emulate the instructions and build the register table until the emulation reaches a breakpoint. The process of emulating the instructions in the file and populating the register table is referred to herein as "tracing" or "micro-tracing."

Then, the VDS 400 preferably analyzes 824 the register table to determine if it contains evidence that the emulated instructions were viral code. In one embodiment, the VDS 400 performs this analysis by determining whether the register table satisfies one or more of the predicates of a register signature. For example, the register signature can specify that a certain virtual register is decremented (or incremented) as would be expected if that register were counting loop iterations of a polymorphic virus decryption loop. In another example, the register signature can specify that the value within a certain virtual register remains unchanged, as would be expected if the code were from a virus that does not use the register. In yet another example, the register signature can specify that a particular register contains a certain value, such as a pointer to a specified memory location, when the emulation finishes. Note that if the viral instructions contain non-emulated instructions that were skipped, the viral code may fail to decrypt itself. Nevertheless, the table might still satisfy a register signature and thereby include evidence that the emulated code was from a virus.

If 826 the VDS 400 determines that the register table contains evidence that the emulated instructions were viral code, it preferably responds 826 by correlating the evidence with other data in order to declare whether the file contains a virus. Depending upon the breakpoint, the VDS 400 may resume the trace of the entry point if it does not detect a virus (this step is not shown in FIG. 8). For example, the VDS will resume the trace if it has emulated only 100 instructions and the breakpoint specifies that a break should occur every 100 instructions until a maximum of 1000 instructions are emulated.

If the VDS 400 finishes tracing the entry point and it does not detect a virus, the VDS determines 722 whether there are more potential entry points in the selected file to trace. If so, the VDS 400 begins a new trace at the next potential entry point. When the VDS 400 has traced all of the potential entry points without detecting evidence of a virus, it determines 830 whether there are more files to check for viruses. If 832 there are more files, the VDS 400 selects another file and repeats the virus detection process described above. If there are no more files, then the VDS 400 completes operation 834.

In sum, evidence of a virus can be detected by determining how a given set of instructions in virus will act on values in a set of registers and then executing one or more code blocks to look for the determined behavior. An embodiment of the present invention uses this property to detect viruses by tracing portions of potential virus host files and comparing the resulting register states with register signatures of known viruses. As a result, the techniques described herein can detect viruses that have obscured entry points and/or utilize instructions that are not emulated.

The above description is included to illustrate the operation of the certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A method for detecting a computer virus in a file on a computer system, comprising the steps of:
    identifying a potential entry point for the computer virus in the file;
    searching near the potential entry point for potential virus instructions that are characteristic of a possible infection by the computer virus;
    responsive to finding one or more potential virus instructions near the entry point:
        specifying an initial state of one or more virtual registers in a virtual machine;
        emulating the potential virus instructions in the virtual machine using the specified initial state of the one or more virtual registers to produce a new state of the virtual registers; and
        examining the new state of the virtual registers to detect evidence of the computer virus.

2. The method of claim 1, wherein the step of searching near the potential entry point comprises the substep of:
    identifying an opcode near the potential entry point that is characteristic of a possible virus infection.

3. The method of claim 2, wherein the identified opcode is an opcode known to be present in a decryption loop of a polymorphic virus.

4. The method of claim 1, wherein the step of specifying an initial state of one or more virtual registers comprises the substep of:
    storing a value in a virtual register known to be utilized by the computer virus.

5. The method of claim 4, wherein the virtual register is known to be utilized by the computer virus for counting loop iterations and wherein the stored value represents a loop count.

6. The method of claim 1, wherein the step of specifying an initial state of one or more virtual registers comprises the substep of:
    storing a value in a virtual register accessible to the potential virus instructions and known to be unused by the computer virus;
    wherein the value in the virtual register accessible to the computer virus is examined to detect evidence of the computer virus.

7. The method of claim 1, wherein the step of emulating the potential virus instructions comprises the substep of:
    skipping potential virus instructions that the virtual machine is incapable of emulating.

8. The method of claim 1, wherein the step of examining the new state of the virtual registers comprises the substep of:
    determining whether a state of a virtual register was altered by the emulated potential virus instructions in a manner consistent with the potential virus instructions being a computer virus.

9. The method of claim 1, wherein the step of examining the new state of the virtual registers comprises the substep of:
    determining whether a new state of a virtual register accessible to the potential virus instructions is identical to the register's initial state.

10. The method of claim 1, wherein the step of specifying an initial state of one or more virtual registers comprises the substep of:
    setting contents of the one or more virtual registers to an approximation of the contents the virtual registers would have had had the instructions preceding the potential virus instructions executed.

11. A virus detection system for detecting a computer virus in a computer system, comprising:
    a virus database for holding a register signature describing an initial virtual register state and a new virtual register state indicating evidence of a computer virus;

an emulating module for emulating computer program instructions in a virtual computer system having the initial virtual register state described by the register signature in the virus database to produce a new virtual register state; and an engine module for analyzing the new virtual register state and the register signature to detect evidence of the computer virus.

12. The virus detection system of claim 11, further comprising:

an emulation control module for identifying an opcode in a computer file that is characteristic of a possible virus infection, wherein the emulating module is adapted to emulate a computer program instruction having the identified opcode.

13. The virus detection system of claim 11, further comprising:

an emulation control module for identifying a potential entry point for the virus in a computer file and searching near the potential entry point for an opcode that is characteristic of a possible virus infection.

14. The virus detection system of claim 11, wherein the emulating module is adapted to set the initial virtual register state described by the register signature by storing a storing a value in a virtual register known to be utilized by the computer virus.

15. The virus detection system of claim 14, wherein the virtual register is known to be utilized by the computer virus for counting loop iterations and wherein the stored value represents a loop count.

16. The virus detection system of claim 11, wherein the emulating module is adapted to set the initial virtual register state described by the register signature by storing a value in a virtual register known to be unused by the computer virus.

17. The virus detection system of claim 11, wherein the emulating module is adapted to skip computer program instructions that are not emulated in the virtual computer system.

18. The virus detection system of claim 11, wherein the engine module is adapted to determine whether a state of a virtual register was altered in a manner consistent with the potential virus instructions being a computer virus.

19. The virus detection system of claim 11, wherein the engine module is adapted to determine whether a new state of a virtual register is identical to the register's initial state.

20. The virus detection system of claim 11, wherein the virus database holds a plurality of register signatures, wherein each register signature describes an initial virtual register state and a new virtual register state indicating evidence of a different computer virus.

21. A computer program product comprising:

a computer-readable medium having computer program logic embodied therein for detecting a computer virus in a computer system, the computer program logic comprising:

a virus database for holding a register signature describing an initial virtual register state and a new virtual register state indicating evidence of a computer virus;

an emulating module for emulating computer program instructions in a virtual computer system having the initial virtual register state described by the register signature in the virus database to produce a new virtual register state; and an engine module for analyzing the new virtual register state and the register signature to detect evidence of the computer virus.

22. The computer program product of claim 21, further comprising:

an emulation control module for identifying an opcode in a computer file that is characteristic of a possible virus infection, wherein the emulating module is adapted to emulate a computer program instruction having the identified opcode.

23. The computer program product of claim 22, wherein the identified opcode is an opcode known to be present in a decryption loop of a polymorphic virus.

24. The computer program product of claim 21, further comprising:

an emulation control module for identifying a potential entry point for the virus in a computer file and searching near the potential entry point for an opcode that is characteristic of a possible virus infection.

25. The computer program product of claim 21, wherein the emulating module is adapted to set the initial virtual register state described by the register signature by storing a storing a value in a virtual register known to be utilized by the computer virus.

26. The computer program product of claim 25, wherein the virtual register is known to be utilized by the computer virus for counting loop iterations and wherein the stored value represents a loop count.

27. The computer program product of claim 21, wherein the emulating module is adapted to set the initial virtual register state described by the register signature by storing a value in a virtual register known to be unused by the computer virus.

28. The computer program product of claim 21, wherein the emulating module is adapted to skip computer program instructions that are not emulated in the virtual computer system.

29. The computer program product of claim 21, wherein the engine module is adapted to determine whether a state of a virtual register was altered in a manner consistent with the potential virus instructions being a computer virus.

30. The computer program product of claim 21, wherein the engine module is adapted to determine whether a new state of a virtual register is identical to the register's initial state.

* * * * *